United States Patent
Schulz et al.

(10) Patent No.: US 10,644,753 B2
(45) Date of Patent: May 5, 2020

(54) METHOD FOR PRODUCING, ESPECIALLY CONFIGURING, A SYSTEM, INCLUDING A CONTACT WIRE AND AN APPARATUS, AND DEVICE FOR CARRYING OUT THE METHOD

(71) Applicant: SEW-EURODRIVE GMBH & CO. KG, Bruchsal (DE)

(72) Inventors: Heiko Schulz, Baden-Baden (DE); Ronny Enenkel, Karlsruhe (DE); Martin Bund, Karlsruhe (DE); Claus Schöpfer, Wiesloch (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 865 days.

(21) Appl. No.: 14/910,932

(22) PCT Filed: Jul. 30, 2014

(86) PCT No.: PCT/EP2014/002078
§ 371 (c)(1),
(2) Date: Feb. 8, 2016

(87) PCT Pub. No.: WO2015/018506
PCT Pub. Date: Feb. 12, 2015

(65) Prior Publication Data
US 2016/0200217 A1    Jul. 14, 2016

(30) Foreign Application Priority Data
Aug. 6, 2013  (DE) .......................... 10 2013 013 017

(51) Int. Cl.
*H04B 3/60*        (2006.01)
*B60L 13/00*      (2006.01)
(Continued)

(52) U.S. Cl.
CPC .................. *H04B 3/60* (2013.01); *B60L 5/38* (2013.01); *B60L 13/00* (2013.01); *B60M 3/00* (2013.01); *B61C 3/00* (2013.01)

(58) Field of Classification Search
CPC .... H04B 3/52; H04B 3/60; B60L 3/00; B60L 9/08; B60L 5/38; B60L 13/00; B61L 3/20; B60M 3/00; B61C 3/00
See application file for complete search history.

(56) References Cited

U.S. PATENT DOCUMENTS 3,735,352 A    5/1973   Pease
4,042,864 A *  8/1977   Norris ....................... B60L 9/12
                                                                318/257
(Continued)

FOREIGN PATENT DOCUMENTS

CH         544685 A  * 11/1973  ................ B61L 3/20
CN       1898103 A     1/2007
(Continued)

OTHER PUBLICATIONS

International Search Report, dated Feb. 4, 2015, issued in corresponding International Application No. PCT/EP2014/002078.
(Continued)

*Primary Examiner* — Zachary L Kuhfuss
(74) *Attorney, Agent, or Firm* — Hunton Andrews Kurth LLP

(57) ABSTRACT

A method for producing, especially configuring, a system is provided, including a contact wire and an apparatus, and device for carrying out the method. The apparatus is able to be supplied with energy with the aid of the contact wire, and information is transmittable from and/or receivable by the apparatus via the contact wire. The contact wire has at least a first, second, fourth and fifth contact conductor that are connected to one respective connector element of the apparatus. The first and second contact conductors have one (Continued)

respective phase of the AC voltage supplying the apparatus. The fourth contact conductor is provided for transmitting information and the fifth contact conductor is provided for receiving information. One of the phases, thus especially the phase acting as signaling phase, is connected electrically to a first connector element, in particular, the first connector element is provided with a corresponding marking or identification when producing the apparatus. A controllable switch, particularly a semiconductor switch, of the apparatus electrically connects the first connector element for periods of time to the connector element connected to the fourth contact conductor, or breaks this connection.

24 Claims, 2 Drawing Sheets

(51) Int. Cl.
*B61C 3/00* (2006.01)
*B60L 5/38* (2006.01)
*B60M 3/00* (2006.01)

(56) References Cited

U.S. PATENT DOCUMENTS

| 2004/0047427 | A1* | 3/2004 | Dostert | H04B 3/54 |
| | | | | 375/260 |
| 2007/0000744 | A1 | 1/2007 | Craig et al. | |
| 2009/0003481 | A1 | 1/2009 | Schopfer et al. | |

FOREIGN PATENT DOCUMENTS

| CN | 101375518 A | 2/2009 |
| DE | 42 02 275 | 7/1993 |
| FR | 2 146 332 | 3/1973 |
| FR | 2 171 784 | 9/1973 |
| WO | 2007/087996 | 8/2007 |

OTHER PUBLICATIONS

International Preliminary Report on Patentability, dated Feb. 25, 2016, issued in PCT/EP2014/002078.

* cited by examiner

METHOD FOR PRODUCING, ESPECIALLY CONFIGURING, A SYSTEM, INCLUDING A CONTACT WIRE AND AN APPARATUS, AND DEVICE FOR CARRYING OUT THE METHOD

FIELD OF THE INVENTION

The present invention relates to a method for producing, especially configuring, a system, including a contact wire and an apparatus, and a device for carrying out the method.

BACKGROUND INFORMATION

It is generally known that information and energy are transmittable via a contact wire to rail vehicles, a contact wire being disposed at the rail, especially parallel to the rail, along which the rail vehicles are movable.

SUMMARY

Therefore, the object of the present invention is to achieve simplified operation.

Important features of the invention with regard to the method are that the method for producing, especially configuring, a system includes a contact wire and an apparatus, the apparatus being able to be supplied with energy with the aid of the contact wire, and information being transmittable from and/or receivable by the apparatus via the contact wire, the contact wire having at least a first, second, fourth and fifth contact conductor which are connected to one respective connector element of the apparatus, the first and second contact conductor having one respective phase of the AC voltage supplying the apparatus, the fourth contact conductor being provided for transmitting information and the fifth contact conductor being provided for receiving information, one of the phases, thus especially the phase acting as signaling phase, being connected electrically to a first connector element, in particular, the first connector element being provided with a corresponding marking or identification when producing the apparatus, a controllable switch, particularly a semiconductor switch, of the apparatus electrically connecting the first connector element for periods of time to the connector element connected to the fourth contact conductor, or breaking this connection, in particular, at least one diode being connected in series to the switch.

The advantage in this context is that information is exchangeable between the vehicle and a stationary control that has a signal evaluation unit and a command unit. The wiring upon start-up is simple. In addition, the apparatus is flexibly usable. The signaling phase is connected to the first connecting terminal labeled as signaling phase.

In one advantageous embodiment, the voltage applied to the fifth contact conductor is fed to a means for detecting voltage, and the detected voltage characteristic is compared to the voltage characteristic of at least one of the phases supplying the apparatus, in particular, is compared to at least one of the phases of the AC voltage supplying the apparatus, and from that, the phase of the AC voltage applied in each case to the fifth contact conductor and/or the algebraic sign of the voltage characteristic of a phase of the AC voltage applied in each case to the fifth contact conductor is determined, in particular, a stationary electronic circuit, especially a primary control, electrically connecting the fifth contact conductor for periods of time to one of the phases. The advantage here is that information is receivable by the apparatus.

In one advantageous development, upon startup of the apparatus, the assignment of the respective phase to one specific connector element is able to be stored, particularly as parameter, in a memory of the apparatus. This offers the advantage that the apparatus is flexibly configurable.

In one advantageous refinement, upon recognition of the phase applied to the connector element connected to the fifth contact conductor, one specific hardware control input is activated as a function of the algebraic sign of the phase. This is advantageous because a high data-transmission rate is attainable.

In one advantageous embodiment, an assignment of the phase applied in each case to the connector element connected to the fifth contact conductor, as well as its specific algebraic sign, to one respective hardware control input is stored in the apparatus, especially in a memory of the apparatus. The advantage in this case is that a high data-transmission rate is attainable.

In one advantageous development, the fourth contact conductor is electrically connected to the fourth connector element, and the fifth contact conductor is electrically connected to the fifth connector element. This offers the advantage that it permits easy startup.

Important features with regard to the device are that the apparatus is able to be supplied electrically with the aid of a contact wire, in particular, the apparatus being disposed on a vehicle that is movable parallel to the contact wire, the contact wire having contact conductors, the contact wire having at least a first, second, fourth and fifth contact conductor which are connected to one respective connector element of the apparatus, the apparatus having a signaling module that has at least one switch by which one of the phases supplying the apparatus is connectable to the fourth contact conductor, in particular, a diode being connected in series to the switch, the apparatus having an evaluation unit which compares the voltage characteristic present at the fifth contact conductor to the voltage characteristic of one of the phases supplying the apparatus, and in particular, from that, determines information transmitted to the apparatus.

The advantage in this context is that data is transmittable from the stationary, primary control to the apparatus, and from the apparatus to the control. The startup is able to be accomplished especially easily, since a flexible configuration of the apparatus is allowed. The reason is that the assignment as to which of the phases of the three-phase voltage system is electrically connected to which connector element, especially connecting terminal, of the apparatus is freely selectable.

In one advantageous refinement, the apparatus has a converter for energizing the traction motor, especially electric motor, of the vehicle, the converter being controllable by a control, which is connected to the signaling module and the evaluation unit. The advantage here is that the drive of the vehicle is controllable with variable speed.

In one advantageous embodiment, disposed at the contact wire is a signal evaluation unit which compares the voltage characteristic present at the fourth contact conductor to the voltage characteristic of one of the phases supplying the apparatus, and in particular, from that, determines information transmitted by the apparatus. This is advantageous because a data stream is reliably transmittable, for information is detectable with a very good signal-to-noise ratio, since not just a single voltage value, but rather a characteristic curve is evaluated.

In one advantageous refinement, disposed at the contact wire is a command unit that has at least one switch by which one of the phases supplying the apparatus is made connectable to the fifth contact conductor, in particular, a diode being connected in series to the switch. The advantage in this case is that data is transmittable to the apparatus.

Further advantages are derived from the dependent claims. The present invention is not limited to the combination of features in the claims. Further useful combination possibilities of claims and/or individual claim features and/or features of the specification and/or of the figures are apparent to one skilled in the art, particularly from the problem definition and/or the objective set by comparison to the related art.

DETAILED DESCRIPTION

In this context, an apparatus is disposed on a vehicle, which is movable along a rail. For example, the associated system is thus an overhead monorail system, apparatus 20 being an electrical apparatus such as a control or the like, for example, which is disposed on the vehicle.

A three-phase contact wire (SL) is installed parallel to the rail.

Figure 1:
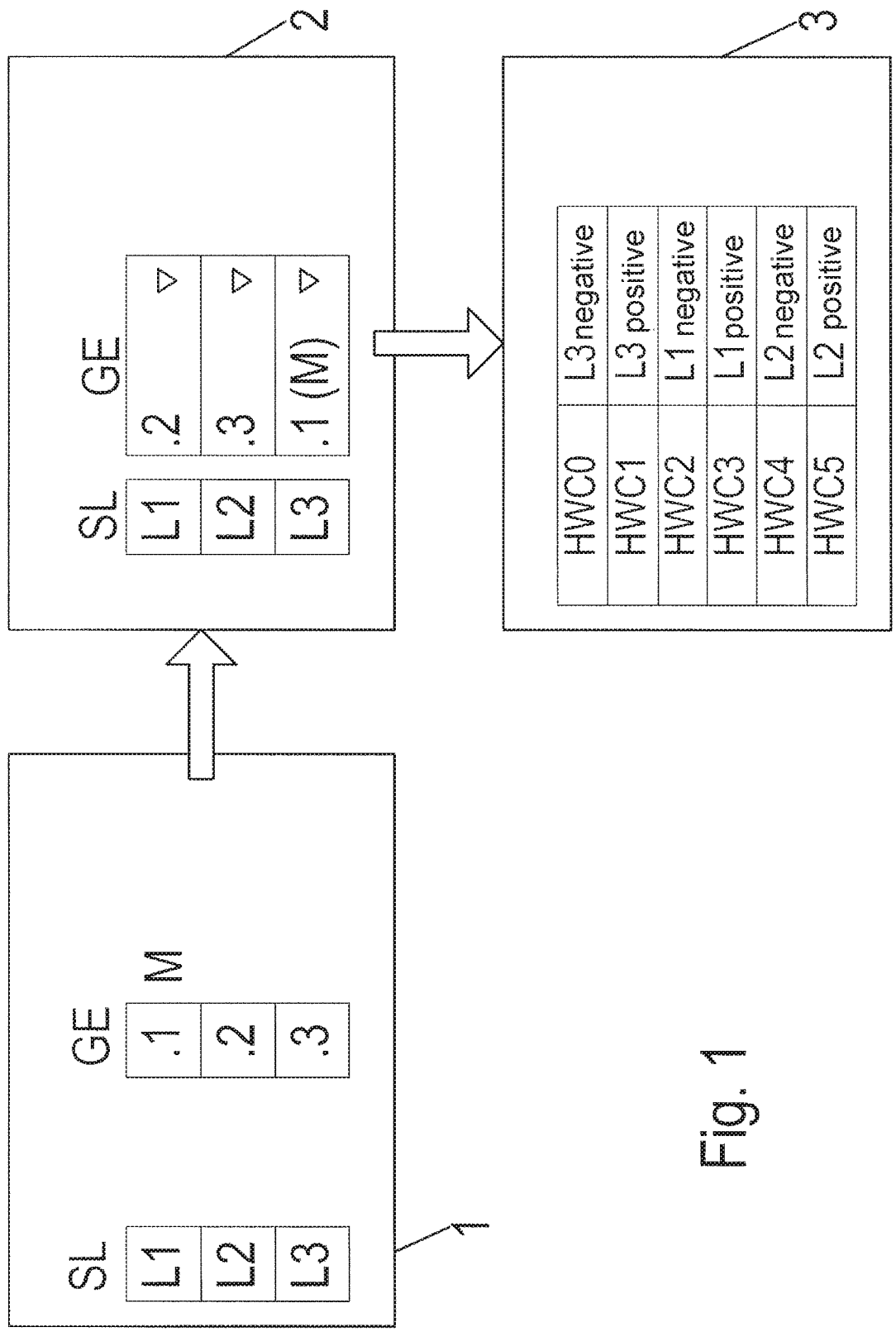
FIG. 1 shows a part of the invention represented schematically.

In the exemplary embodiment, contact wire (SL) has at least five contact conductors SL, of which the three contact conductors SL shown in FIG. 1 are provided for the power supply of apparatus 20. The fourth contact conductor, not shown in FIG. 1, is used for sending information from apparatus 20 via contact wire (SL) to a stationary primary control. The fifth contact conductor (SL), likewise not shown in FIG. 1, is used for transmitting information from the stationary primary control to apparatus 20.

Each of the three contact conductors SL shown in FIG. 1 has one of the respective phases of the three-phase voltage source. Thus, apparatus 20 is able to be supplied with three-phase current.

Figure 2:
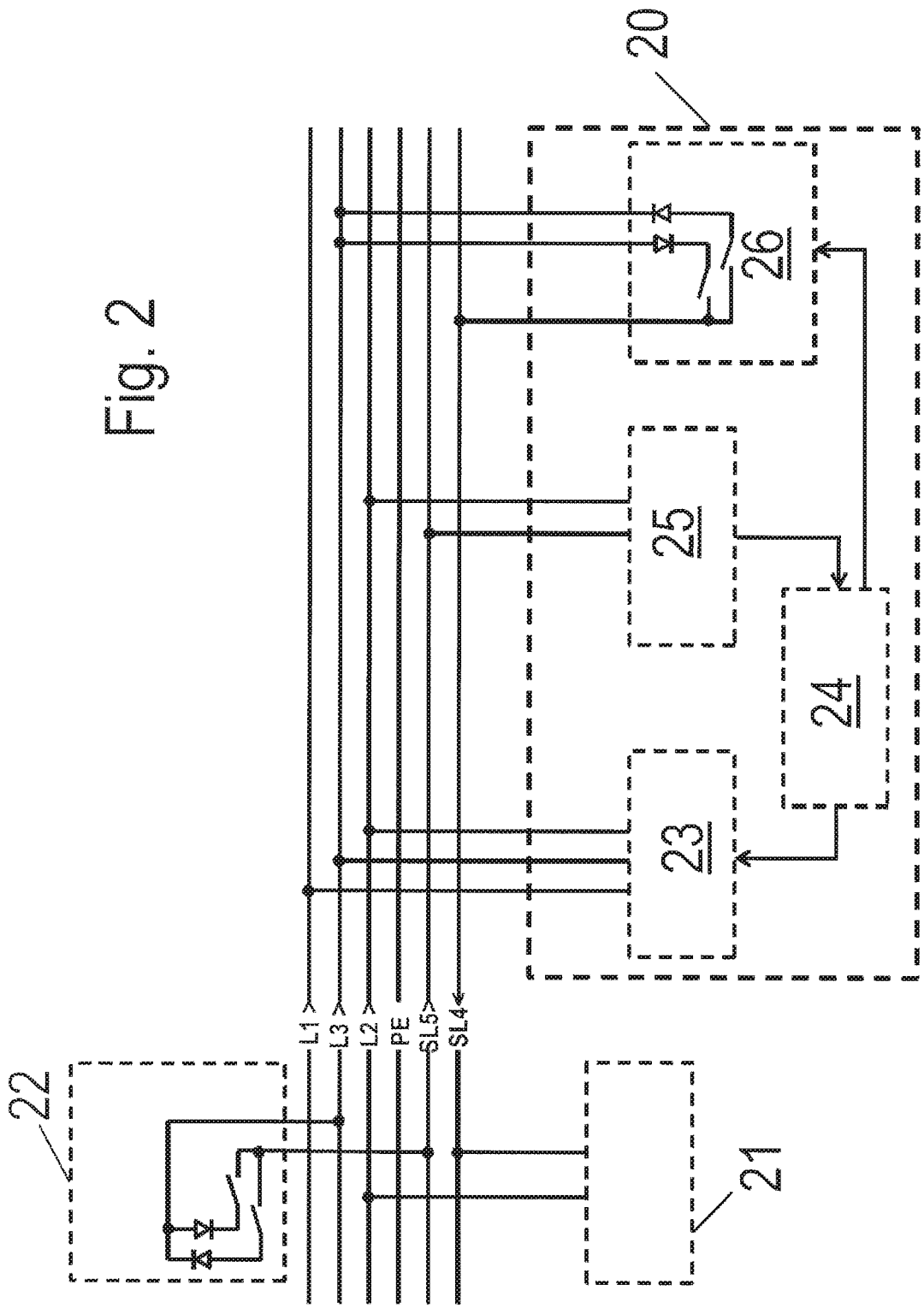
FIG. 2 shows apparatus 20 in combination with a command unit and a signal evaluation unit.

One of the three contact conductors SL shown in FIG. 1 is provided as what is referred to as signaling phase (M). Thus, it is used as signal source for the check-back signal. In this context, apparatus 20 has switches which make the positive or negative voltage component of signaling phase (M), particularly phase L3 in FIG. 2, connectable to fourth contact conductor SL4. In this way, information is able to be encoded. A first state, the application of the positive component of the voltage conducted in signaling phase L3 to fourth contact conductor SL4, a second state, the application of the negative component of the voltage conducted in signaling phase L3 to fourth contact conductor SL4, and a third state, the non-application of signaling phase L3 to fourth contact conductor SL4, are usable for the encoding. The respective switch of signaling module 26 thus only has to implement the connection or a disconnect. The connecting must take place at the time intervals corresponding to the positive or negative voltage values.

In this manner, data is able to be encoded by apparatus 20 and transmitted via fourth contact conductor SL4. Since three states are transmittable, a higher data-transmission rate is transmittable than when using a system having only two transmittable states.

The data encoded on fifth contact conductor SL5 is likewise encoded by the algebraic sign of the voltage of a phase L3, thus check-back phase, of the three-phase voltage system applied in each case, or by its non-application. To that end, a primary control or a stationary apparatus has a command unit 22 having switches, which electroconductively connects either the positive or negative voltage characteristic of first phase L3 to fifth contact conductor SL5 or—not shown in FIG. 2—alternatively, the second phase to fifth contact conductor SL5, or further alternatively, the third phase to fifth contact conductor SL5. To be sure, a means for detecting the voltage of apparatus 20 applied to fifth contact conductor SL5 is able to detect the voltage and its algebraic sign; however, unequivocal recognition is only feasible by knowing the phase, thus, check-back phase, for the detected voltage of fifth contact conductor SL5 is then recognizable with the voltage of the corresponding phase, thus, check-back phase, e.g., L3. In the case of comparison with another supply phase of the three-phase current source, the information transmitted with the fifth contact conductor would not be recognizable without error.

Therefore, it is necessary that apparatus 20 be notified as to which of the respective phases is present at which of its connector elements of its apparatus input GE.

Thus, according to the present invention, apparatus 20 is able to be supplied in three-phased fashion, and in addition, data is transmittable to apparatus 20 via fifth contact conductor SL5, which is connected for periods of time to one phase, e.g., L2. Furthermore, data is able to be sent from apparatus 20 by connecting fourth contact conductor SL4 to signaling phase L3, thus, one of the three phases (L1, L2, L3) of the three-phase voltage.

Phases (L1, L2, L3) of the three-phase voltage are made available with correspondingly connected contact conductors (SL1, SL2, SL3) of the contact wire to apparatus 20, and make it possible to supply apparatus 20 with electrical energy. Apparatus 20 has connector elements such as connecting terminals, which are denoted by .1, .2 and .3 in FIG. 1.

During installation, in each case one contact conductor (SL1, SL2, SL3, SL4, SL5) of contact wire (SL) is connected to one respective connector element of apparatus 20. As exemplary wiring, in FIG. 1, third phase L3 of contact wire (SL) is connected to first connector element .1 of apparatus 20. Second phase L2 of contact wire (SL) is connected to third connector element .3 of apparatus 20, and first phase L1 of contact wire (SL) is connected to second connector element .2 of apparatus 20.

Apparatus 20 has an electronic circuit which includes a parameterizable memory. Consequently, the wiring configuration is able to be taken into consideration during installation or initial operation, and the appropriate function is able to be assigned to each connector element (.1, .2, .3) of apparatus 20.

Thus, the connector element to which signaling phase L3, that is also denoted by (M) in FIG. 1, is connected is assigned the designation ".1", and is now identified as first connector element. In the same way, the designations ".2" and ".3" are assigned to the two other connector elements. Connector element .1 of apparatus 20 is identified or labeled in such a way that during the wiring, it is clear that signaling phase (M) is to be connected to the connector element. In FIG. 1, L3 is signaling phase (M).

Parameterization 2 is shown in block 2. In this context, apparatus 20 is informed as to which phase is connected to which of its connector elements. Although the wiring of the phases not used as signaling phases is arbitrary, the phase (L1, L2, L3) connected to respective connector element (.1, .2, .3) is made known to apparatus 20 during parameterization 2.

Furthermore, in each case one hardware control input is then assigned to the algebraic sign of the applied voltage values, for example, the negative algebraic sign of the voltage values of third phase L3 of contact wire (SL) is assigned to hardware control input HWC0, and the positive algebraic sign of the voltage values of third phase L3 of contact wire (SL) is assigned to hardware control input HWC1. The further assignments are apparent from FIG. 1. This assignment is shown in block 3 in FIG. 1, and is implemented in the electronic circuit with the aid of software. To recognize the specific phase, the voltage detected at the fifth contact conductor by a sensor is compared to at least one of the phases (L1, L2, L3). As soon as it has been recognized by comparison, which phase the detected voltage signal resembles the most, and to which algebraic sign the characteristic corresponds, the corresponding hardware input (HWC0, HWC1, HWC3, HWC4, HWC5) is set. In FIG. 1, the assignment is stored in internal assignment table 3.

Therefore, the wiring, thus the connections, between phases (L1, L2, L3) of contact wire (SL) and connector elements (.1, .2, .3) may be implemented in any way desired, with the exception of the connection of signaling phase L3 to connector element .1. In the case of any wiring, thus, one-to-one assignment of phases (L1, L2, L3) of contact wire (SL) to connector elements (.1, .2, .3), apparatus 20 is supplied from supply phases (L1, L2, L3). After signaling phase (M) has been connected to the connector element of apparatus 20, particularly to first connector element (.1) of apparatus 20, the communications link is operable, as information is able to be encoded by the connection of the connector element of apparatus 20 connected to fourth contact conductor SL4, to signaling phase L3, thus, to first connector element (.1) of apparatus 20 for periods of time.

The assignment of phases (L1, L2, L3) of the three-phase voltage system supplying apparatus 20 via contact wire (SL), to connector elements (.1, .2, .3) is made known to an electronic memory of apparatus 20 during parameterization 2, so that information received via the fifth contact conductor is able to be decoded.

The indicated switches disposed in apparatus 20 are located in a signaling module 26 of apparatus 20. The signaling module is part of the electronic circuit of apparatus 20. A further part of the electronic circuit is a converter 23, especially an inverter, for feeding the drive of the vehicle. Thus, the vehicle has a drive that is controllable in variable-speed fashion.

Converter 23 is driven by a control 24, especially a control logic. Connected to control 24 is an evaluation unit 25, which compares the voltage applied to fifth contact conductor SL5 to the voltage present at phase L2, and from that, determines which of hardware inputs (HWC0, HWC1, HWC3, HWC4, HWC5) is to be set; in particular, in the case of a positive voltage characteristic of phase L2, input HWC5 of control 24 is set, and in the case of a negative voltage characteristic of phase L2, input HWC4 is set.

A diode is connected in series to each of the switches indicated. In each case, a further series connection is connected in parallel to this series connection, this further series connection likewise having an oppositely oriented diode and a switch. In this way, with the first-named switch, the positive component, and with the other switch, the negative component of the voltage characteristic present at the phase supplying the apparatus is connectable to the fourth or fifth contact conductor. Thus, in each case, the positive and negative component of the voltage characteristic is able to be carried on separately.

LIST OF REFERENCE NUMERALS

1 Wiring
2 Parameterization
3 Internal assignment table
20 Apparatus
21 Signal evaluation unit
22 Command unit
23 Converter, especially inverter, for feeding the drive of the vehicle
24 Control, especially control logic
25 Evaluation unit
26 Signaling module
SL Contact conductor
GE Apparatus input
M Signaling phase

What is claimed is:

1. A method for producing a system that includes a contact wire and an apparatus,
the apparatus being able to be supplied with energy with the aid of the contact wire, and information being transmittable from and/or receivable by the apparatus via the contact wire,
the contact wire having at least a first, second, third, fourth, and fifth contact conductors that are connected to a respective one of a first, second, third, fourth and fifth connector elements of the apparatus, the first and second contact conductors having one respective phase of an AC voltage supplying the apparatus, the fourth contact conductor transmitting information, and the fifth contact conductor receiving information, the method comprising:
connecting one of the phases electrically to a first connector element; and
controlling a controllable switch of the apparatus electrically to one of:
create a connection of a first connector element for periods of time to a connector element connected to the fourth contact conductor, and
break the connection;
wherein at least one diode is connected in series to the switch.

2. The method as recited in claim 1, wherein the connected phase acts as a signaling phase.

3. The method as recited in claim 1, wherein the first connector element is provided with a corresponding marking or identification when producing the apparatus.

4. The method as recited in claim 1, wherein the controllable switch is a semiconductor switch.

5. The method as recited in claim 1, further comprising, upon startup of the apparatus, storing an assignment of a respective phase to a specific connector element in a memory of the apparatus.

6. The method as recited in claim 1, further comprising, upon recognition of the phase applied to the connector element connected to the fifth contact conductor, activating a specific hardware control input as a function of an algebraic sign of the phase.

7. The method as recited in claim 1, further comprising storing in a memory of the apparatus an assignment of the phase applied in each case to the connector element connected to the fifth contact conductor, and an algebraic sign of the phase, to one respective hardware control input.

8. The method as recited in claim 1, further comprising:
electrically connecting the fourth contact conductor to the fourth connector element; and electrically connecting the fifth contact conductor to the fifth connector element.

9. The method according to claim 1, wherein a plurality of diodes are series connected to the switch.

10. A method for producing a system that includes a contact wire and an apparatus,
the apparatus being able to be supplied with energy with the aid of the contact wire, and information being transmittable from and/or receivable by the apparatus via the contact wire,
the contact wire having at least a first, second, third, fourth, and fifth contact conductors that are connected to a respective one of a first, second, third, fourth and fifth connector elements of the apparatus, the first and second contact conductors having one respective phase of an AC voltage supplying the apparatus, the fourth contact conductor transmitting information, and the fifth contact conductor receiving information, the method comprising:
connecting one of the phases electrically to a first connector element;
controlling a controllable switch of the apparatus electrically to one of:
create a connection of a first connector element for periods of time to a connector element connected to the fourth contact conductor, and
break the connection;
wherein at least one diode is connected in series to the switch;
feeding a voltage applied to the fifth contact conductor to a means for detecting voltage;
comparing a detected voltage characteristic to a voltage characteristic of at least one of the phases supplying the apparatus;
based on the comparing, determining at least one of the phase of the AC voltage applied in each case to the fifth contact conductor and an algebraic sign of the voltage characteristic of a phase of the AC voltage applied in each case to the fifth contact conductor.

11. The method as recited in claim 10, wherein a stationary electronic circuit corresponding to a primary control electrically connects the fifth contact conductor for periods of time to one of the phases.

12. The method as recited in claim 10, wherein the comparing includes comparing the detected voltage characteristic to at least one of the phases of the AC voltage supplying the apparatus.

13. A device, comprising:
an apparatus supplied electrically with a contact wire and disposed on a vehicle that is movable parallel to the contact wire, the contact wire having at least a first, second, third, fourth and fifth contact conductors that are connected to one of a first, second, third, fourth, and fifth respective connector elements of the apparatus, wherein the apparatus includes:
a signaling module that has at least one switch by which one of a plurality of phases supplying the apparatus is connectable to the fourth contact conductor, and
an evaluation unit that compares a voltage characteristic present at the fifth contact conductor to a voltage characteristic of one of the phases supplying the apparatus, and based on the comparison, determines information transmitted to the apparatus.

14. The device as recited in claim 13, wherein a diode is connected in series to the switch.

15. The device as recited in claim 13, wherein the apparatus has a converter for energizing a traction motor of the vehicle, and wherein the converter is controllable by a control, which is connected to the signaling module and the evaluation unit.

16. The device as recited in claim 15, wherein the traction motor is an electric motor.

17. The device as recited in claim 13, wherein the evaluation unit is disposed at the contact wire.

18. The device as recited in claim 13, further comprising a command unit disposed at the contact wire, the command unit including at least one further switch by which one of the phases supplying the apparatus is made connectable to the fifth contact conductor.

19. The device as recited in claim 18, wherein a diode is connected in series to the further switch.

20. A method for producing a system that includes a contact wire and an apparatus,
the apparatus being able to be supplied with energy with the aid of the contact wire, and information being transmittable from and/or receivable by the apparatus via the contact wire,
the contact wire having at least a first, second, third, fourth, and fifth contact conductors that are connected to a respective one of a first, second, third, fourth and fifth connector elements of the apparatus, the first and second contact conductors having one respective phase of an AC voltage supplying the apparatus, the fourth contact conductor transmitting information, and the fifth contact conductor receiving information, the method comprising:
connecting one of the phases electrically to a first connector element; and
controlling a controllable switch of the apparatus electrically to selectively:
create a connection of the first connector element, connected to the one of the phases, for periods of time to a connector element connected to the fourth contact conductor, and
break the connection;
wherein at least one diode is connected in series to the switch; and
wherein the first connector element is provided with a corresponding marking or identification when producing the apparatus.

21. The method according to claim 20, wherein a plurality of diodes are series connected to the switch.

22. A method for producing a system that includes a contact wire and an apparatus,
the apparatus being able to be supplied with energy with the aid of the contact wire, and information being transmittable from and/or receivable by the apparatus via the contact wire,
the contact wire having at least a first, second, third, fourth, and fifth contact conductors that are connected to a respective one of a first, second, third, fourth and fifth connector elements of the apparatus, the first and second contact conductors having one respective phase of an AC voltage supplying the apparatus, the fourth contact conductor transmitting information, and the fifth contact conductor receiving information, the apparatus including a controllable switch and at least one diode connected in series to the switch, the method comprising:
connecting one of the phases electrically to a first connector element;
controlling the switch of the apparatus electrically to one of:

create a connection of a first connector element for periods of time to a connector element connected to the fourth contact conductor, and
break the connection;
feeding a voltage applied to the fifth contact conductor to a voltage-detection device;
comparing a detected voltage characteristic to a voltage characteristic of at least one of the phases supplying the apparatus; and
based on the comparing, determining at least one of the phase of the AC voltage applied in each case to the fifth contact conductor and an algebraic sign of the voltage characteristic of a phase of the AC voltage applied in each case to the fifth contact conductor.

23. The method as recited in claim 22, wherein a stationary electronic circuit corresponding to a primary control electrically connects the fifth contact conductor for periods of time to one of the phases.

24. The method as recited in claim 22, wherein the comparing includes comparing the detected voltage characteristic to at least one of the phases of the AC voltage supplying the apparatus.

\* \* \* \* \*